Patented Aug. 20, 1940

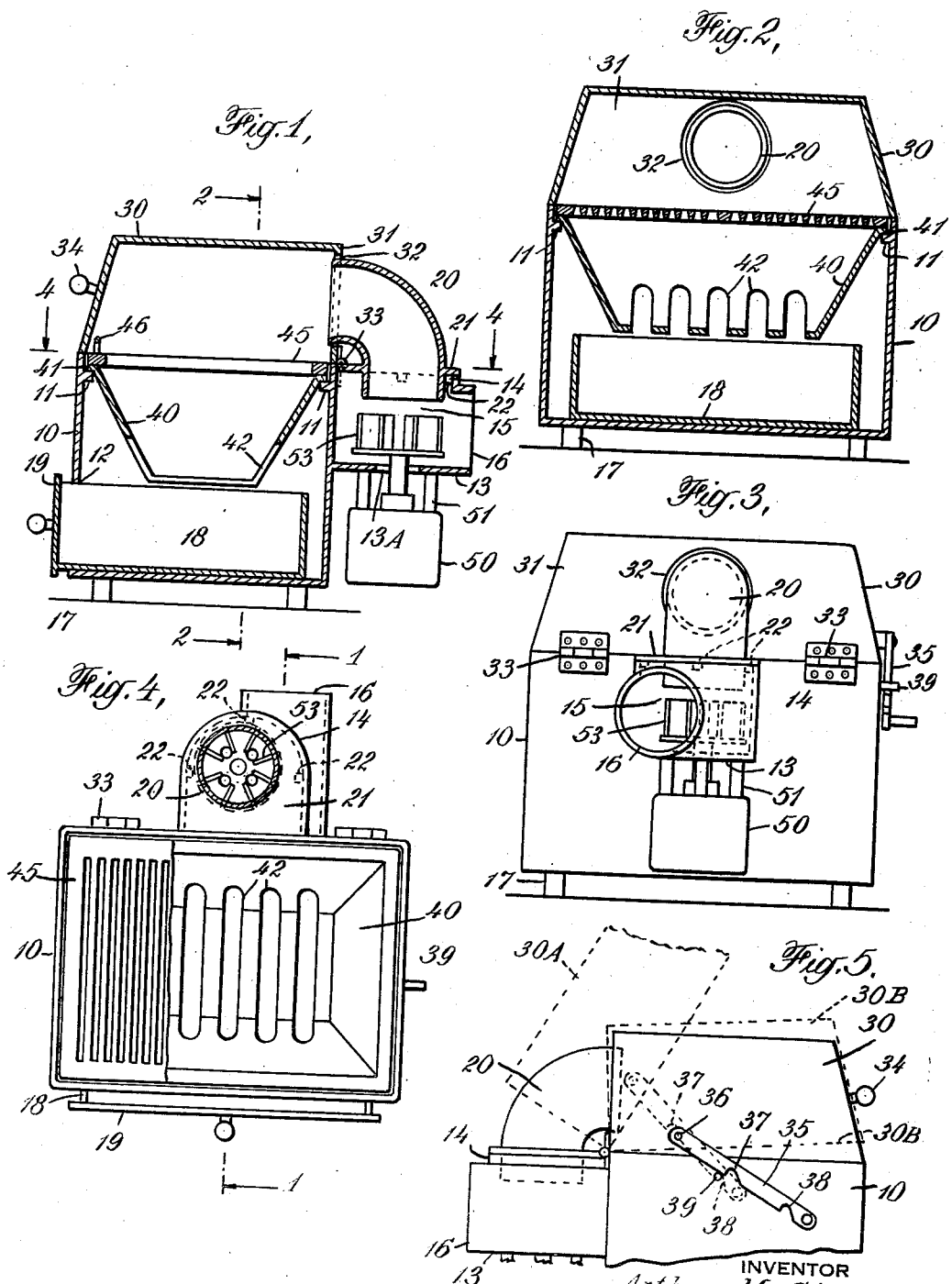

2,211,940

UNITED STATES PATENT OFFICE 2,211,940

BROILER

Arthur Merrick Stoner, West Hartford, Conn.

Application July 7, 1938, Serial No. 217,864

7 Claims. (Cl. 126—15)

This invention relates to improvements in broilers.

Its object is to provide a simple, compact device which is efficient in operation and is capable of giving superior cooking results without the escape of undesired odors.

More specifically, it relates to an arrangement for broiling by a charcoal fire, in which the charcoal may be used without the usual trouble of soiling the operator and parts adjacent the fire box. The parts are so constructed that they may be disassembled readily for cleaning purposes.

Another specific object is to provide an arrangement associated with the cover which draws off the gases of combustion and the fumes of the food being broiled, even when the cover is lifted for inspection or for the manipulation or removal of the food.

These and other objects of the invention will appear in the following specification in which I will describe the invention, the novel features of which will be set forth in appended claims.

Referring to the drawing:

Fig. 1 is a side elevation mostly in section, of a broiler which is made according to and embodies my invention. The section is taken on the line 1—1 of Fig. 4;

Fig. 2 is a transverse section on the line 2—2 of Fig. 1;

Fig. 3 is a rear elevation of the parts shown in the other figures;

Fig. 4 is a sectional plan view of the device with a part of its grid broken away, the section being taken on the line 4—4 of Fig. 1; and Fig. 5 is a partial side elevation of the device showing its cover support.

10 designates a substantially rectangular box-like casing, open at the top, provided on at least two of its sides with inwardly projecting ledges 11 near their upper edges. 12 is an opening in the lower part of the front side of the casing.

At the rear of the casing is a housing formed of a horizontal shelf 13, the rear end of which is semi-circular, and a wall 14 which extends upwardly from this shelf to a level slightly below that of the rear upper edge of the casing 10. 15 designates the chamber formed by this housing. The housing is also shaped to form a cylindrical outlet 16 to which a vent pipe may be connected. Legs 17 project from the bottom of the casing to form an air space between it and the surface upon which the device is supported.

20 is a hollow 45° elbow of circular cross section. This is provided with an integral flange 21 which is adapted to rest on the upper edge of the wall 14. The front edge of the flange is straight and lugs 22 which fit inside of the wall 14 are provided to hold this straight edge of the flange 21 against the rear wall of casing 10.

30 is a cover which fits the top of casing 10. Its rear wall 31 is perforated, as at 32 to form a clearance hole for the elbow 20. This rear wall is pivoted to the rear wall of casing 10 by hinges 33, the axis of which is the axis of the curvature of elbow 20. 34 is a handle on the front of cover 30. 35 (Fig. 5), is a cover support pivoted to the cover 30 at 36, and notched at 37 and 38 to engage a pin 39 on the side of casing 10.

18 is a drawer which enters the opening 12 in the front of the casing and which is slidably supported on the bottom of the casing. The front of the drawer is flanged, as at 19 (Fig. 1), to overlap the opening 12 when the drawer is closed.

40 is a fire pot having flanges 41 projecting from its upper edges to rest upon the ledges 11. In the particular form shown, this fire pot has inwardly sloping sides. 42 designates a plurality of parallel transverse slots through the bottom and through the lower part of opposite sides of the fire pot. This particular form of fire pot is especially designed for burning charcoal.

45 is a grid which rests loosely on the upper edge of the fire pot. 46 is a ring on the front central part of the grid to facilitate its manipulation.

50 is an electric motor under and supported on shelf 13 by interposed posts 51 of heat insulating material. The motor shaft 52 extends through an opening 13A in the shelf of larger diameter than that of the motor shaft and drives a squirrel-cage type of blower 53 in the chamber 15.

In use, charcoal is placed in the fire box 40 and lighted kindling, such as a piece of paper, is placed in the drawer 18. The latter is left open, as shown in Fig. 1, to form an air inlet and the motor energized to drive the blower 53. The blower draws the air and the gases of combustion through the elbow 20 into chamber 15 and discharges them through outlet 16. It also draws air which surrounds the motor upwardly through the opening 13A and thus creates an air circulation which prevents the motor from becoming over-heated.

It is to be noted that the drawer 18 will catch the ash from the burnt fuel and that it also serves as an adjustable damper for controlling the air inlet to the fire pot which can be closed when desired by the flange 19.

The cover may be lifted to the position in which it is shown in dotted lines at 30A in Fig. 5 and held by its support for the insertion or manipulation of food on the grate 45. The cover may be maintained in a slightly raised position 30B by engaging the notch 37 of its support 35 with the pin 39 when it is desirable to have some air drawn into the device above the grate. The relations between the back of the cover and the elbow 20 are not disturbed by moving the cover to any of its positions, so that the gases of combustion and fumes from the broiling food will be drawn through the elbow and discharged through outlet 16.

I have described what I now consider a preferred embodiment of this invention, but intend no limitations other than those imposed by the appended claims.

What I claim is:

1. A broiler comprising a casing a fire pot and a grid therein, a hinged cover over the casing, a housing on the casing forming a chamber, an exhaust blower in the chamber, a curved draft outlet supported on the housing and extending into the housing, the axis of curvature of said outlet coinciding substantially with the axis of the cover hinge.

2. A broiler comprising a casing, a fire pot and a grid therein, a hinged cover over the casing, a housing on the casing forming a chamber, an exhaust blower in the chamber, a motor supported by the housing connected to drive the blower, a curved draft outlet supported on the housing and extending into the housing, the axis of curvature of said outlet coinciding substantially with the axis of the cover hinge.

3. A broiler comprising a casing, a fire pot and a grid therein, a hinged cover over the casing, a housing on the casing forming a chamber, an exhaust blower in the chamber, a motor supported by the housing having a shaft connected with the blower, said housing being constructed with an air opening through which the motor shaft extends, a curved draft outlet supported on the housing and extending into the housing, the axis of curvature of said outlet coinciding substantially with the axis of the cover hinge.

4. A broiler comprising a casing, a fire pot suspended from the upper part of the casing, a loose grid over the fire pot, said casing being constructed with an opening in its lower part, a drawer under the fire pot arranged to open and close said opening, a hinged cover over the casing having a flat side, a housing on the casing forming a chamber, an exhaust blower in the chamber, and a curved draft outlet supported on the housing extending into the housing and through the flat side of the casing, the axis of curvature of said outlet coinciding substantially with the axis of the cover hinge.

5. A broiler comprising a casing, a fire pot suspended from the upper part of the casing, a loose grid over the fire pot, said casing being constructed with an opening in its lower part, a drawer under the fire pot arranged to open and close said opening, a hinged cover over the casing, a housing on the casing forming a chamber, an exhaust blower in the chamber, a motor supported by the housing connected to drive the blower, a curved draft outlet supported on the housing and extending into the housing, the axis of curvature of said outlet coinciding substantially with the axis of the cover hinge.

6. A broiler comprising a casing, a fire pot suspended from the upper part of the casing, a loose grid over the fire pot, said casing being constructed with an opening in its lower part, a drawer under the fire pot arranged to open and close said opening, a hinged cover over the casing, a housing on the casing forming a chamber, an exhaust blower in the chamber, a motor supported by the housing having a shaft connected with the blower, said housing being constructed with an air opening through which the motor shaft extends, a curved draft outlet supported on the housing and extending into the housing, the axis of curvature of said outlet coinciding substantially with the axis of the cover hinge.

7. A broiler comprising a casing, a fire pot suspended from the upper part of the casing, a loose grid over the fire pot, said casing being constructed with an opening in its lower part, a drawer under the fire pot arranged to open and close said opening, a hinged cover over the casing, a housing on the casing forming a chamber communicating with the upper part of the casing, an exhaust blower in the chamber, a motor spaced from and supported by the housing having a shaft connected with the blower, said housing being constructed with an air opening through which the motor shaft extends and through which air is drawn by the blower.

ARTHUR MERRICK STONER.